3,784,535
NONAPEPTIDE INTERMEDIATE TO GONADO-
TROPIN RELEASING HORMONE
George Rogelio Flouret, Waukegan, Ill., assignor to
Abbott Laboratories, North Chicago, Ill.
No Drawing. Filed Sept. 13, 1971, Ser. No. 180,159
Int. Cl. C07c 103/52; C07g 7/00; C08h 1/00
U.S. Cl. 260—112.5
8 Claims

ABSTRACT OF THE DISCLOSURE

The synthesis of the nonapeptide His-Trp-Ser-Tyr-Gly-Leu-Arg-Pro-Gly-amide carrying easily removable protective groups on the Ser, Tyr, Arg and optionally on the His moieties is described. The correspondingly protected octapeptide is used as the starting material. The nonapeptide, upon removal of any $N^\alpha$-protective group on the histidine moiety is an important intermediate for the preparation of the gonadotropin-releasing hormone.

DETAILED DESCRIPTION OF THE INVENTION

Recent discovery of the aminoacid sequence of the gonadotropin (Gn)-releasing hormone (RH) has made it highly desirable to produce this substance on a practical scale in a purity sufficient to use the substance therapeutically in instances of hormone deficiencies and possibly as a regulating agent for the ovulation cycle in female warm-blooded animals. For instance, small doses of Gn-RH administered intravenously to female sheep in the anestrus cycle produces ovulation. The formula of the Gn-RH has been identified with the amino-acid sequence pyro-Glu-His-Trp-Ser-Tyr-Gly-Leu-Arg-Pro-Gly-NH$_2$ but in order to make such a large molecule from simple, single aminoacids, a considerable number of steps including several condensation reactions are required. In order to assure such condensations to take place at the desired sites, other active sites or functional groups on the molecule may be conveniently protected by some groups that can be removed at will.

A relatively simple method has now been devised to produce the desired aminoacid chain in surprisingly good yields. The now method involves a minimum of group-protecting and removal reactions for such protective groups and employs a number of new intermediates which are important stepping stones for making Gn-RH and other peptides.

For the purpose of the present disclosure, it is to be understood that all aminoacids used herein are in their optically active L-form except for glycine.

The present invention is particularly concerned with the nonapeptide which is the immediate precursor for making Gn-RH and carries protective groups on the reactive sites of the serine, tyrosine and arginine moieties that can be removed by simple methods, if desired, to make the unprotected nonapeptide or, if desired, after further peptide chain extension. It is another object of the present invention to provide a process for the preparation of a protected nonapeptide that may be used directly for making the corresponding decapeptide. It is a further object of this invention to provide a poly-protected nonapeptide that can be used without adding any further protective groups to make the correspondingly protected Gn-RH.

These and other objects are accomplished by providing

Y-(N$^{Im}$-X)His-Trp(O-R)Ser-(O-R')Tyr-Gly-
Leu-(N$^\alpha$-R'')Arg-Pro-Gly-NH$_2$    (I)

wherein R, R' and R'' are protective groups that are removable by hydrogenation or treatment with hydrofluoric acid and X and Y are hydrogen or protective groups that can be removed from the peptide without affecting R, R' and R''; ordinarily R is represented by tetrahydropyranyl, tert.-butyl, acetyl, benzyloxycarbonyl or benzyl; R' is tetrahydropyranyl, tert.-butyl, acetyl, benzyloxycarbonyl, benzyl, triphenylmethyl or tosyl and R'' is nitro, tosyl, benzyloxycarbonyl or tetrachloroisopropyloxyphthaloyl which is used to substitute one of the hydrogen atoms in the amino groups of the guanidine moiety in Arg; Y is hydrogen, tert.-butoxycarbonyl, o-nitrophenylsulfenyl, 2-(p-diphenyl)-isopropyloxycarbonyl, benzyloxycarbonyl, trifluoroacetyl or phthalyl. In all instances where a benzyl moiety is present in the protective group, its p-position may carry a halogen, methoxy or a nitro group.

The protected nonapeptide of Formula I is prepared by reacting the protected octapeptide Trp-(O-R)Ser-(O-R') - Tyr-Gly-Leu-(N$^\alpha$-R'')Arg-Pro-Gly-NH$_2$ with Y-His in an inert solvent: Y-His is

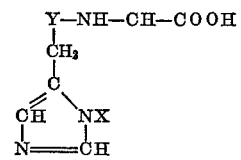

wherein Y is tert.-butyloxycarbonyl, benzyloxycarbonyl, p - methoxybenzylcarbonyl, p - nitrobenzyloxycarbonyl, 2 - (p - diphenyl)isopropyloxycarbonyl, o-nitrophenylsulfenyl, phthalyl or trifluoroacetyl and X is hydrogen, tosyl, 2,4-dinitrophenyl, benzyl or another easily removable protective group. The protective group Y can be removed by conventional methods to produce the nonapeptide carrying only protective groups X, R, R' and R'' although X may be hydrogen. The protected nonapeptide of Formula I wherein Y is hydrogen can be converted to the similarly protected (X, R, R' and R'' are the same as above) decapeptide by reacting it with polyglutamic acid pentachlorophenyl ester from which the free decapeptide (or Gn-RH) can be obtained by treating it with hydrofluoric acid. During this reaction, the protective groups X, R, R' and R'' all are removed and replaced by hydrogen. Alternately, some protective groups can be removed by hydrogenation using a palladium catalyst.

In a more specific embodiment, the above-named protected octapeptide wherein X is hydrogen, R and R' are benzyl and R'' is NO$_2$ is dissolved in dimethylformamide at a high concentration, preferably at a molarity of between 0.1 to 1.0 and at least an equimolar amount of tert.-butyloxycarbonylhistidine or a similarly N$^\alpha$-protected histidine which may also carry a protective group as the imidazole-nitrogen is added at a temperature between 0 and 30° C. followed by the addition of an equimolar amount of dicyclohexylcarbodiimide. After several hours, the reaction solution is evaporated and the residue is dissolved in 15% methanol/chloroform and the solution is placed on a chromatographic column. The column is first eluted with chloroform containing 5% methanol to remove unreacted starting material; the desired reaction product is eluted subsequently with chloroform containing larger concentrations of methanol. The desired fractions of eluate are then combined and crystallized.

In order to prepare Gn-RH from the above material, the protective group Y is removed from the His moiety by any of the suitable methods known in the peptide art and the resulting tri-protected nonapeptide is reacted wih pyroglutamic acid pentachlorophenyl ester. The resulting tri-protected decapeptide is then suspended in anisole and placed in a HF-resistant reaction vessel and treated there at a temperature between 0° and 30° C. with excess hydrogen fluoride. The excess hydrogen fluoride is removed after about one hour, the solvent is removed and the product is dried and purified. The Gn-RH prepared in this manner is highly active in biological tests, showing lutenizing-hormone and follicle-stimulating hormone-releasing activity in warm-blooded animals.

In order to make the octapeptide used as the starting material for the present invention, the following reaction sequence is carried out: N-benzyloxycarbonyl-proline-p-nitrophenyl ester is reacted with glycinamide, preferably with an excess of the latter over the equimolar amount, and the obtained N-benzyloxycarbonyl-prolylglycinamide is converted to the unprotected dipeptide by hydrogenation or acid treatment. The prolylglycinamide is then reacted with $N^\alpha$-benzyloxycarbonyl - $N^\omega$-nitro - arginine to form a twice-protected tripeptide from which the benzyloxycarbonyl group is removed by acid treatment to furnish $N^\omega$-nitro-arginyl-prolylglycinamide, hereinafter referred to as -($N^\omega$-$NO_2$)Arg-Pro-Gly-$NH_2$. The latter is reacted with N-tert.-butyloxycarbonyl-leucine p-nitrophenyl ester to produce a twice-protected tetrapeptide from which the tert.-butyloxycarbonyl group is removed by treatment with an acid to yield Leu-($N^\omega$-$NO_2$)Arg-Pro-Gly - $NH_2$. This $NO_2$-protected tetrapeptide is reacted with N-tert.-butyloxycarbonylglycine p-nitrophenyl ester to a twice-protected pentapeptide from which the tert.-butyloxycarbonyl group is removed as in the case of the tetrapeptide to produce Gly-Leu-($N^\omega$-$NO_2$)Arg-Pro-Gly-$NH_2$. In turn, this pentapeptide is reacted with N-tert.-butyloxycarbonyl-O-benzyl-tyrosine p-nitrophenyl ester to produce a hexapeptide with three protective groups. The tert.-butyloxycarbonyl group is removed by treatment of this material with trifluoroacetic acid/methylene chloride 1:1 to give the twice-protected hexapeptide (O-Bzl)Tr - Gly - Leu-($N^\omega$-$NO_2$)Arg-Pro-Gly-$NH_2$.

The above twice-protected hexapeptide is reacted with N-tert.-butyloxycarbonyl-O-benzyl-serine p - nitrophenyl ester to produce a heptapeptide carrying four protective groups. The tert.-butyloxycarbonyl group is removed as in the case of the hexapeptide to yield the three-times protected heptapeptide (O-Bzl)Ser-(O-Bzl)Tyr-Gly-Leu-($N^\omega$-$NO_2$)Arg-Pro-Gly-$NH_2$. Reacting the latter with N-tert.-butyloxycarbonyl-tryptophane p-nitrophenyl ester and subsequently removing the tert-butyloxycarbonyl group with trifluoroacetic acid/methylene chloride 1:1 containing a small amount of mercaptoethanol produces the octapeptide Trp-(O-Bzl)Ser-(O-Bzl)Tyr-Gly-Leu - ($N^\omega$-$NO_2$)Arg-Pro-Gly-$NH_2$ containing the three protective groups of the precursor.

All of the above condensation reactions are carried out in the presence of an inert solvent such as dimethylacetamide or dimethylformamide or other organic liquids that do not react with either of the starting materials or the products of each step. Of course, it is to be understood, that the above reaction sequence may be followed without using the specific protective groups named in each of the described stages. For instance, the benzyl groups used to protect the free hydroxy groups in serine or tyrosine or hydrogen atoms at other reactive sites may be replaced by tetrahydropyranyl, tert.-butyl, acetyl, trifluoroacetyl, benzyloxycarbonyl, p-methoxy, p-nitro- or p-halobenzyloxycarbonyl and in the case of tyrosine also with triphenylmethyl or tosyl; the nitro group protecting the amino group in the guanidine moiety of arginine may be replaced by converting the amino group to an amide or half-amide with a sulfonic or a carboxylic acid, e.g., tosyl, benzyloxycarbonyl, p - nitrobenzyloxycarbonyl or tetrachloro-isopropyloxyphthaloyl. In all instances, the protective groups, of course, should be chosen in such a way that they can easily be removed by one or more simple treatments which are mild enough as not to affect the aminoacid chain bonds. If desired, the protective groups may be removed stepwise; for instance, where R and R' are the usual benzyl or substituted benzyl ethers, these groups may be removed by hydrogenation or treatment with hydrogen bromide-trifluoroacetic acid and subsequently, the protective group on the arginyl fragment can be removed by a suitable reaction step that does not affect the amino-acid links. Of course, such a reaction sequence may be reversed, if desired.

In order to show the preparation of the new nonapeptide, reference is made to the following examples which are to be understood as illustrations only and are not to be construed to limit the invention in any respect.

Example 1

To a solution of 296 mg. of tert.-butyloxycarbonyl-histidine in 4 ml. of dimethylformamide was added 1.31 g. of Trp-(O-Bzl)Ser-(O-Bzl)Tyr - Gly-Leu - ($N^\omega$-$NO_2$)Arg-Pro-Gly-$NH_2$. After adding 240 mg. of dicyclohexylcarbdiimide in 2 ml. of methylene chloride, the mixture was allowed to stand at room temperature for 16 hours. The solvent was then evaporated and the product was dissolved in about 4 ml. of 15% methanol in chloroform. This solution was placed on a chromatographic column (30 cm. high, 2.4 cm. diameter) containing 45 g. of silica gel. The column was eluted initially with 200 ml. of 5% methanol in chloroform and subsequently with 200 ml. of 15% methanol in chloroform which eluted the desired product. Small fractions of this eluate were tested for purity by thin-layer chromatography and the fractions containing the desired material were pooled. After evaporation of the solvent from this pool, the residue was dried over phosphorous pentoxide at 100° C. to yield 1.174 g. of $N^\alpha$-tert.-butyloxycarbonyl-His-Trp-(O-Bzl)Ser-(O - Bzl)Tyr - Gly-Leu-($N^\omega$-$NO_2$)Arg-Pro-Gly-$NH_2$ of high purity, showing $R_f$ in 15% $CH_3OH/CHCl_3$ of 0.2, $[\alpha]_D^{24} = -19.4°$ (c. 1; AcOH) and a M.P. of 156–9° C. The NMR spectrum and nitrogen analysis were consistent with the structure of the desired peptide.

By replacing the Trp-(O-Bzl)Ser-(O-Bzl)Tyr-Gly-Leu-($N^\omega$-$NO_2$)Arg-Pro-Gly-$NH_2$ used above with other octapeptides of the same sequence but carrying other protective groups, the following nonapeptides are prepared in the same manner.

Y-His-Trp-(O-tBp)Ser-(O-Bzl)Tyr-Gly-Leu-($NO_2$) Arg-Pro-Gly-$NH_2$

Y-Mis-Trp-(O-Z)-Ser-(O-Biz)Tyr-Gly-Leu-($NO_2$) Arg-Pro-Gly-$NH_2$

Y-His-Trp-(O-THP)Ser-(O-Bzl)Tyr-Gly-Leu-($NO_2$) Arg-Pro-Gly-$NH_2$

Y-His-Trp-(O-MeOBz)Ser-(O-Bzl)Tyr-Gly-Leu-($NO_2$) Arg-Pro-Gly-$NH_2$

Y-His-Trp-(O-Ac)Ser-(O-Bzl)Tyr-Gly-Leu($NO_2$) Arg-Pro-Gly-$NH_2$

Y-His-Trp-(O-Bzl)Ser-(O-Z)Tyr-Gly-Leu-($NO_2$) Arg-Pro-Gly-$NH_2$

Y-His-Trp-(O-Bzl)Ser-(O-TRI)Tyr-Gly-Leu($NO_2$) Arg-Pro-Gly-$NH_2$

Y-His-Trp-(O-Bzl)Ser-(O-Ac)Tyr-Gly-Leu-($NO_2$) Arg-Pro-Gly-$NH_2$

Y-His-Trp-(O-Bzl)Ser-(O-Tos)Tyr-Gly-Leu-($NO_2$) Arg-Pro-Gly-$NH_2$

Y-His-Trp-(O-Bzl)Ser-(O-THP Tyr-Gly-Leu-($NO_2$) Arg-Pro-Gly-$NH_2$

Y-His-Trp-(O-Bzl)Ser-(O-tBu)Tyr-Gly-Leu-($NO_2$) Arg-Pro-Gly-$NH_2$

Y-His-Trp-(O-Bzl)Ser-(O-MeOBzl)Tyr-Gly-Leu($NO_2$) Arg-Pro-Gly-$NH_2$ wherein Y is a suitable N-blocking group for histidine that can be removed without affecting the aminoacid chain and without disturbing the protective groups on Arg, Ser and Tyr, Z stands for benzoxycarbonyl, THP means tetrahydropyranyl, t Bu is tert.-butyl, MeoOBzl is p-methoxybenzyl, Tos is tosyl (p-toluenesulfonyl), Ac is acetyl and TRI is trityl (=triphenylmethyl). Other appropriate substituents that may be used include the trifluoroacetyl and other known alkyl groups that can be cleaved without affecting the desired peptide sequence. In all instances, the $N^\omega$ of arginine may carry the tosyl group, benzyloxycarbonyl or similar protective groups in place of the above used nitro group. In each case, the reaction described above proceeds in the same fashion and all of the listed compounds may be converted to Gn-RH by the condensation with a suitable pyroglumatic acid ester as described above, making these compounds equally useful precursors therefor.

Of course, the synthesis for the protected octapeptide described above has to be modified when making the octapeptides carrying different protective groups on the $N^\omega$-arginyl, the seryl or the tyrosyl moieties. Using the other respectively protected aminoacids in the shown sequence does not alter the synthesis described in a significant manner. The individual aminoacids carrying the above-shown protective groups are known in the art and are often used in peptide syntheses; they are described in the English edition of the textbook by Schröder et al., entitled The Peptides I (Academic Press 1965) on pp. 167–174 for arginine, pp. 210–212 for serine and pp. 222–25 for tyrosine or in Peptides, Proceedings of the 8th European Peptide Symposium, edited by Beyerman (North-Holland Publishing Co., Amsterdam 1967) p. 50 ff., for arginine. While the above compounds use the $N^{Im}$-unsubstituted histidyl fragment, (X=H), the compounds wherein X is tosyl can be synthesized in the same manner and that substituent can be removed in the same reaction step that removes the other listed protective groups.

Example 2

A solution of 900 mg. of tert.-butyloxycarbonyl-His-Trp-(O-Bzl(Ser-(O-Bzl)Tyr - Gly - Leu-($N^\omega$-$NO_2$)Arg-Pro-Gly-$NH_2$ in 20 ml. of trifluoroacetic acid: methylene chloride (1:1), 200 mg. of mercatoethanol and 0.8 g. of anisole was allowed to stand at room temperature for 15 minutes. The solution was evaporated and the residue was dissolved in methylene chloride, evaporated again. This procedure was repeated five times. The resulting dry material was then dissolved in methanol and the solution was treated with an ion exchange resin (in the OH-cycle) to release the free nonapeptide (still carrying the identified R, R' and R'' groups but wherein Y=H) which was obtained by evaporating the methanol solution to dryness. $R_f$ 0.1 in 15% MeOH/$CHCl_3$, showing a single spot. The NMR spectrum and the elemental analysis confirm the expected aminoacid sequence.

To further characterize this material, the above compound was condensed with pyroglutamic acid pentachlorophenyl ester to the corresponding decapeptide in dimethylformamide. The condensation product was isolated from the reaction solution by evaporation, dissolution in chloroform and purification by chromatography, using chloroform with increasing amounts of methanol as the eluate. The obtained decapeptide (with R=R'=benzyl, R'=$NO_2$, Y=pyroGlu) was then treated with excess hydrogenfluoride using anisole as the scavenger for $NO_2^+$ and benzylcarbonium ions resulting from the deprotection reaction. Work-up of the reaction mixture by known methods furnished the compound of Formula I wherein Y is pyroGlu and X, R, R' and R'' are hydrogen. This product was found to be identical with a sample of nattural Gn-RH.

I claim:

1. The nonapeptide Y-($N^{Im}$-X)His-Trp-(O-R)Ser-(O-R')Tyr-Gly-Leu-($N^\omega$-R'')Arg - Pro-Gly - $NH_2$ wherein Y is hydrogen or an easily removable protective group, X is hydrogen or an easily removable protective group and R, R' aand R'' are hydrogen or protective groups which can be removed by one or more chemical treatments which do not affect the peptide chain.

2. The nonapeptide of claim 1 wherein Y is hydrogen.

3. The nonapeptide of claim 1 wherein Y is tert.-butyloxycarbonyl.

4. The process of preparing the nonapeptide Y-($N^{Im}$-X)-His-trp - (O-R)Ser-(O-R')Tyr - Gly - Leu - ($N^\omega$-R'') Arg-Pro-Gl-$NH_2$ wherein X is hydrogen or an easily removable protective group on the imidazole-N, Y is an easily removable protective group attached to the amino-N of His and R, R' and R'' are protective groups which can be removed by one or more chemical treatments which do not affect the aminoacid chain, comprising treating the octapeptide Trp-(O-R)Ser-(O-R)Tyr-Gly-Leu-($N^\omega$-R'')Arg-Pro-Gly-$NH_2$ with excess Y-($N^{Im}$-X)His wherein R, R' and R'' and Y are defined as above, in the presence of an inert polar, organic solvent at a temperature between 0° and 30° C. for a period of at least one hour and isolating the resulting nonapeptide from the reaction mixture.

5. The process of claim 4 wherein R and R' are benzyl, R'' is $NO_2$, X is hydrogen and Y is tert.-butyloxycarbonyl.

6. The process of claim 4 wherein Y-($N^{Im}$-X)His is tert.-butyloxycarbonylhistidine.

7. The process of claim 4 wherein said inert, polar solvent is dimethylformamide.

8. The process of claim 4 wherein the protective groups X, R, R' and R'' are subsequently removed and replaced by hydrogen by treating said protected nonapeptide with hydrogen fluoride.

References Cited

Baba et al.: Biochem. Biophys. Res. Comm., 44, 459 (July 16, 1971).

Matsuo et al.: Biochem. Biophys. Res. Comm., 43, 1334 (June 18, 1971).

LEWIS GOTTS, Primary Examiner

R. J. SUYAT, Assistant Examiner

UNITED STATES PATENT OFFICE
CERTIFICATE OF CORRECTION

Patent No. 3,784,535     Dated January 8, 1974

Inventor(s) George Rogelio Flouret

It is certified that error appears in the above-identified patent and that said Letters Patent are hereby corrected as shown below:

In Column 2, delete the formula:

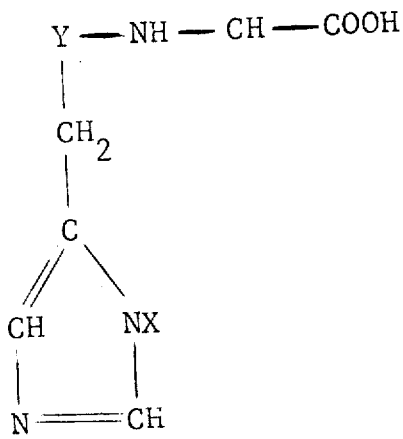

and substitute therefor:

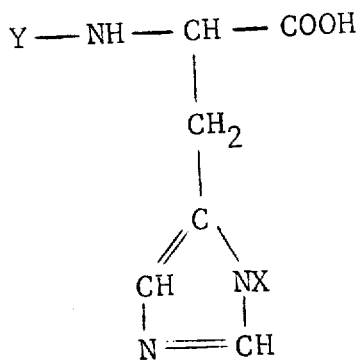

Signed and sealed this 26th day of November 1974.

(SEAL)
Attest:

McCOY M. GIBSON JR.
Attesting Officer

C. MARSHALL DANN
Commissioner of Patents